United States Patent
Reid et al.

(10) Patent No.: US 11,810,136 B2
(45) Date of Patent: *Nov. 7, 2023

(54) SYSTEMS AND METHODS FOR ASSESSING IMPLICIT ASSOCIATIONS

(71) Applicant: Sentient Decision Science, Inc., Portsmouth, NH (US)

(72) Inventors: Aaron Ashley Reid, Rye, NH (US); Clinton Lee Taylor, Portsmouth, NH (US)

(73) Assignee: Sentient Decision Science, Inc., Portsmouth, NH (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/326,663

(22) Filed: May 21, 2021

(65) Prior Publication Data

US 2022/0058671 A1   Feb. 24, 2022

Related U.S. Application Data

(63) Continuation of application No. 16/734,895, filed on Jan. 6, 2020, now Pat. No. 11,030,633, which is a continuation of application No. 16/006,369, filed on Jun. 12, 2018, now Pat. No. 10,546,310, which is a continuation of application No. 14/179,866, filed on Feb. 13, 2014, now abandoned.

(60) Provisional application No. 61/905,438, filed on Nov. 18, 2013.

(51) Int. Cl.
G06Q 30/0203 (2023.01)

(52) U.S. Cl.
CPC .............................. *G06Q 30/0203* (2013.01)

(58) Field of Classification Search
None
See application file for complete search history.

(56) References Cited

U.S. PATENT DOCUMENTS

| | | |
|---|---|---|
| 6,327,574 B1 | 12/2001 | Kramer et al. |
| 8,180,667 B1 | 5/2012 | Baluja et al. |
| 8,589,495 B1 | 11/2013 | Beckert |
| 8,660,912 B1 | 2/2014 | Dandekar |
| 8,696,360 B2 | 4/2014 | Cvencek et al. |

(Continued)

OTHER PUBLICATIONS

Maison, Dominika, Anthony G. Greenwald, and Ralph H. Bruin. "Predictive validity of the Implicit Association Test in studies of brands, consumer attitudes, and behavior." Journal of consumer psychology 14.4 (2004): 405-415 A1 (Year: 2004).*

(Continued)

*Primary Examiner* — Darlene Garcia-Guerra
(74) *Attorney, Agent, or Firm* — Goodwin Procter LLP

(57) ABSTRACT

Embodiments of the invention relate generally to systems, methods, and apparatus for assessing consumer perception of business features, such as brands, products, and services. A graphical user interface presents a consumer with a prime associated with the business feature. The graphical user interface presents a target to be sorted by the consumer. An instruction from the consumer is received (via a user input device) to sort the target into a bin presented on the graphical user interface. Consumer response data associated with the instruction from the consumer is generated and, based on the consumer response data, the consumer's perception of the business feature is assessed.

20 Claims, 17 Drawing Sheets

(56) References Cited

U.S. PATENT DOCUMENTS

| | | | |
|---|---|---|---|
| 8,855,926 | B1 | 10/2014 | Murphy et al. |
| 8,939,903 | B2 | 1/2015 | Roberts et al. |
| 9,558,499 | B2 | 1/2017 | Forbes |
| 2002/0015064 | A1 | 2/2002 | Robotham et al. |
| 2007/0166675 | A1* | 7/2007 | Atkins .................. G09B 7/04 434/236 |
| 2007/0265507 | A1 | 11/2007 | de Lemos |
| 2008/0065468 | A1 | 3/2008 | Berg et al. |
| 2009/0030864 | A1 | 1/2009 | Pednault et al. |
| 2009/0036756 | A1 | 2/2009 | Pradeep et al. |
| 2009/0063256 | A1 | 3/2009 | Pradeep et al. |
| 2009/0164132 | A1 | 6/2009 | Jung et al. |
| 2009/0192417 | A1* | 7/2009 | Mon-Williams ..... A61B 5/1124 600/595 |
| 2009/0192867 | A1 | 7/2009 | Farooq et al. |
| 2009/0254541 | A1 | 10/2009 | Kolawa et al. |
| 2009/0300528 | A1 | 12/2009 | Stambaugh |
| 2009/0327068 | A1 | 12/2009 | Pradeep et al. |
| 2010/0004977 | A1 | 1/2010 | Marci et al. |
| 2010/0010317 | A1 | 1/2010 | De Lemos |
| 2010/0028846 | A1 | 2/2010 | Cohen et al. |
| 2010/0166320 | A1 | 7/2010 | Paquier |
| 2010/0198680 | A1 | 8/2010 | Ma et al. |
| 2011/0034176 | A1 | 2/2011 | Lord et al. |
| 2011/0258049 | A1* | 10/2011 | Ramer ............... G06Q 30/0273 705/14.69 |
| 2012/0010978 | A1 | 1/2012 | Ramer et al. |
| 2012/0035428 | A1 | 2/2012 | Roberts et al. |
| 2012/0042339 | A1 | 2/2012 | Kitts et al. |
| 2012/0105486 | A1 | 5/2012 | Lankford et al. |
| 2012/0296701 | A1* | 11/2012 | Breiter ............... G06Q 30/0203 705/7.33 |
| 2013/0024465 | A1 | 1/2013 | Schiff et al. |
| 2013/0060602 | A1 | 3/2013 | Rupp et al. |
| 2013/0159054 | A1 | 6/2013 | Evans et al. |
| 2013/0290094 | A1* | 10/2013 | Srivastava ......... G06Q 30/0245 705/14.44 |
| 2013/0302773 | A1* | 11/2013 | Cvencek .................. G09B 7/02 434/335 |
| 2013/0346545 | A1* | 12/2013 | Petersen ........... G06F 16/24578 709/217 |
| 2014/0081768 | A1 | 3/2014 | Hocking, Jr. et al. |
| 2014/0142967 | A1 | 5/2014 | Bedrosian et al. |
| 2014/0195979 | A1 | 7/2014 | Branton et al. |
| 2014/0201001 | A1 | 7/2014 | Rellas et al. |
| 2014/0336539 | A1* | 11/2014 | Torres ................... A61B 5/162 600/595 |
| 2014/0337868 | A1 | 11/2014 | Garza et al. |
| 2014/0365208 | A1 | 12/2014 | De Choudhury et al. |
| 2016/0188181 | A1 | 6/2016 | Smith |
| 2016/0300252 | A1* | 10/2016 | Frank .................. G06F 21/6245 |

OTHER PUBLICATIONS

Schnabel, Konrad, Jens B. Asendorpf, and Anthony G. Greenwald. "Using Implicit Association Tests for the assessment of implicit personality self-concept." Handbook of personality theory and testing 50828 (2008) (Year: 2008).*

Cacicoppo, et al., "Rudimentary Determinants of Attitudes, II: Arm Flexion and Extension Have Differential Effects on Attitudes," Journal of Personality and Social Psychology, 1993, vol. 65, No. 1, pp. 5-17.

Fazio et al., "Implicit Measures in Social Cognition Research: Their Meaning and Use", Annu. Rev. Psychol. 2003. 54:297-327.

Fazio, et al., "Variability in Automatic Activation as an Unobtrusive Measure of Racial Attitudes: A Bona Fide Pipeline?," Journal of Personality and Social Psychology, 1995, vol. 69, No. 6, pp. 1013-1029.

Heuer, et al., "Avoidance of Emotional Facial Expressions in Social Anxiety: The Approach-Avoidance Task," Journal of Behaviour Research and Therapy, 2007, vol. 45, pp. 2990-3001.

Karpinski, et al., "The Single Category Implicit Association Test as a Measure of Implicit Social Cognition," Journal of Personality and Social Psychology, 2006, vol. 91, No. 1, pp. 16-32.

Kraus, Alexandra A., "Indirect procedures for the measurement of approach-avoidance motivation," PhD thesis submitted to Business and Social Sciences, Aarhus University, in partial fulfilment of the requirements of the PhD degree in the Department of Business Administration Feb. 2014.

Marsh, et al., "The Effects of Fear and Anger Facial Expressions on Approach- and Avoidance-Related Behaviors," Emotion, 2005, vol. 5, No. 1, pp. 119-124.

Mortensen, et al., "Infection Breeds Reticence: The Effects of Disease Salience on Self-Perceptions of Personality and Behavioral Avoidance Tendencies," Psychological Science, 2010, vol. 21, No. 3, pp. 440-447.

Nevid, Jeffrey S., "Introduction to the Special Issue: Implicit Measures of Consumer Response—The Search for the Holy Grail," St. John's University, vol. 27, Issue 10; Special Issue: Implicit Measures of Consumer Response, Oct. 2010, pp. 913-920.

Rinck, et al., "Approach and Avoidance in Fear of Spider," Journal of Behavior Research and Therapy and Experimental Psychiatry, 2007, vol. 38, pp. 105-120.

Seibt, Beate, et al., "Movement direction or change in distance? Self and object-related approach-avoidance motions," Journal of Experimental Social Psychology 44 (2008), 3, pp. 713-720.

Shiffrin, et al., "A Survey of Model Evaluation Approaches with a Tutorial on Hierarchical Bayesian Methods," Cognitive Science, 2008, vol. 32, pp. 1248-1284.

Zhang, et al., "Mapping the Behavioral Affordances of Face Stimuli," 30th European Conference on Visual Perception, Aug. 27-31, 2007, 3 pages, Abstract.

* cited by examiner

SYSTEMS AND METHODS FOR ASSESSING
IMPLICIT ASSOCIATIONS

CROSS-REFERENCE TO RELATED APPLICATIONS

This application is a continuation of U.S. patent application Ser. No. 16/734,895, filed Jan. 6, 2020, which is a continuation of U.S. patent application Ser. No. 16/006,369, filed Jun. 12, 2018, which is a continuation of U.S. patent application Ser. No. 14/179,866, filed Feb. 13, 2014, which claims priority to and the benefit of U.S. Provisional Patent Application No. 61/905,438, filed Nov. 18, 2013, the entire contents of each of which are hereby incorporated by reference.

FIELD OF THE INVENTION

Aspects of the invention are generally related to deriving implicit information through the observation of behavior and, more particularly, to understanding implicit associations with brands, products, packaging, pricing, and the impact of advertising.

BACKGROUND OF THE INVENTION

Merchants have a general interest in understanding how their products, services, brands, and advertisements are perceived by consumers. By understanding what drives consumer purchasing decisions, merchants hope to obtain new customers, improve customer loyalty, and increase sales. Knowledge of consumer perception is an important aspect of any marketing or advertising campaign.

Consumer perception is often assessed with the use of surveys that seek feedback from consumers about a merchant's products and services. To be effective, such surveys are generally short and simple, and contain several key elements. Survey results are typically compared with results from previous surveys, which allows the merchant to assess consumer perception over time. Unfortunately, existing approaches for assessing consumer perception are generally incomplete, inaccurate, inefficient, and difficult to implement.

There is a need for improved systems and methods for predicting consumer behavior and assessing automatic associations (e.g., emotional or subconscious associations) with brands, products, services, packaging, and advertising.

SUMMARY OF THE INVENTION

Embodiments of the invention increase predictive validity of implicit research data derived from priming (e.g., evaluative priming) and response time tasks. In certain implementations, the systems and methods achieve this by increasing engagement through real time feedback on accuracy and speed, incorporating visual and audial techniques to enhance emotional impacts of primes, measuring degree of associations through behavioral measures, applying hierarchical Bayesian estimation modeling principles in a new arena, incorporating auditory primes and target judgments, and creating a game-like task. Embodiments of the invention also increase the number of implicit associations that can be measured in a single session or exercise through a "reverse priming" technique.

Compared to prior approaches, the invention is generally more engaging for participants and allows for hundreds of judgments to be made in a single study session. Predictive validity (i.e., more accuracy in predicting a behavior of interest) of the data may be enhanced through at least one of the following: a novel visual design; real time feedback on speed and accuracy creating a natural tension of performance between the two measures, which improves the nature of the implicit data being collected; increased emotional stimulation through prime elements visually and audibly approaching the user; incorporation of behavioral response techniques through natural approach/avoidance behavioral interaction, such as swiping toward/away, moving a mobile device toward versus away, shaking a head yes or no, averting or fixating gaze, pupil dilation, facial coding data (e.g., indicative of happy or angry), or vocal cues ("yes" or "no") etc.; incorporation of both visual and auditory primes and target judgments; and experimental design enhancements which apply hierarchical Bayesian estimation techniques to significantly increase the breadth of data captured in a single implicit association study.

Embodiments of the invention combine techniques from four distinct arenas into a single process that measures the subconscious and conscious associations between two concepts. The systems and methods are the first to combine: 1) affective priming with 2) multiple behavioral response measures, while simultaneously including 3) feedback gamification principles and 4) experimental design allowing for hierarchical Bayesian estimation of unobserved implicit associations.

Embodiments of the invention also use an affective priming and response time task to assess the automatic associations of visual or auditory stimuli and concepts (e.g., attributes, emotions, relevance to the self, etc.). The affective priming tasks differ meaningfully from Implicit Association Tests (IAT) in that there is generally no pairing of categories during the judgment portion of the task. In an affective priming task, users or participants are asked to sort words and/or images into categories (e.g., positive vs. negative). In the priming condition, a visual and/or auditory stimulus appears prior to revealing a target visual or auditory stimulus. The premise of the test is that if the prime evokes associations consistent with the target, the participant will make judgment on the target more quickly, and if the prime evokes associations inconsistent with the target, the participant will be slower in judgment. Thus, there is no explicit judgment of whether the prime belongs in one of the categories, rather there is simply the measurement of whether the prime influences a participant's ability to accurately and quickly sort target stimuli into categories. In this way, the technique is an implicit measurement of degree of association between the prime stimulus and the categories. Embodiments of the invention use this basic technique and modify the process of presentation, the experimental design of a typical study, as well as the methods of interaction to capture different kinds of associations, and produce associations that are more predictively accurate through feedback and gamification.

Compared to prior approaches, the systems and methods described herein utilize a key mechanism behind affective priming that is important for participants to adhere to in order to capture meaningful implicit data. In an affective priming task there is always a correct answer on a target judgment (e.g., the word "good" is correctly sorted into a "positive" not a "negative" bucket). The researcher, however, is interested in knowing how quickly the participant can make the judgment following a prime. Participants are therefore typically instructed to be fast, but also accurate. This trade-off is critical for accurate measurement of implicit associations. If participants simply go fast without any motivation to avoid errors, then the resulting data will likely be "noisy" and less predictively valid. Similarly, if participants go very slowly and cogitate on which response option is correct, then the effect of the prime is reduced and the resulting data is also "noisy." Thus, this trade-off between speed and accuracy is critical for the optimal assessment of implicit associations. In certain embodiments, the invention incorporates elements of gaming by providing real-time performance feedback to participants on their speed and accuracy after each judgment—thereby increasing motivation to optimize performance and providing more valid implicit association data.

In addition to enhancing the affective priming technique and incorporating gaming principles to increase the predictive validity of the data, embodiments of the invention incorporate additional behavioral measures of implicit associations. It is presently found that the degree of arm flexion and arm extension exhibited by a participant in an experiment is a reliable measure of the degree of approach versus avoidance emotion felt toward a target concept. Similarly, the movement of a joystick either toward or away from the body is an accurate behavioral measure of the degree of approach versus avoidance emotion. This effect can even be enhanced by manipulating the target image to zoom toward or away from the user while the user indicates whether he or she feels an approach or avoidance emotion toward the target. Importantly, in each of these cases the measurement of movement is not self-reported, but the judgment being made is a conscious judgment of like versus dislike. It is in this last way, the conscious judgment of a target, that the systems and methods described herein make a meaningful and unique advancement. Embodiments of the invention incorporate behavioral response measures (e.g., movements toward versus away from the body such as finger swipes, movement of a device, etc.). These measures, however, are taken either from both conscious choice situations (i.e., a target with no prime) and subconscious association situations (i.e., judgments on an independent target following the exposure to a prime). In this way, embodiments of the invention incorporate multiple implicit behavioral measures and affective priming techniques.

Additionally, compared to prior approaches, embodiments of the invention further innovate by including experimental design, which allows for the incorporation of Hierarchical Bayesian estimation of subconscious associations. Hierarchical Bayesian estimation is a statistical procedure, used for estimating the unknown parameter values in cognitive psychological models. This invention incorporates experimental designs (e.g., the number and specific pairing of primes and targets) that allow for the presentation of only a subset of all primes and targets to any individual participant, while still allowing for the estimation of all prime and category associations for the individual participant by borrowing information from other participants' experimentally designed data, through the use of Hierarchical Bayesian estimation procedures.

In one aspect, the invention relates to a system for assessing consumer perception (e.g., consumer affinity towards a product). The system includes a memory device for storing a plurality of primes. At least one of the primes is associated with a business feature (e.g., a brand, a product, a service, a package, a shelf image, an interior store image, an exterior store image, an advertising image, a price, a trademark, a service mark, and/or a trade dress). The system also includes a processor for causing the rendering of a graphical user interface, which includes a priming zone, a sorting zone, and at least two sorting bins or options. A prime is presented to a consumer within the priming zone, followed by presentation of a target within the priming zone, and the target transitions into the sorting zone. The system also includes a user input interface, which the consumer uses to sort the target into one of the sorting bins, thus creating consumer response data representative of the consumer's perception of the business feature.

In certain embodiments, the system includes a communications module for transmitting the consumer response data to a remote server. The memory device, processor, and communications module may include or form components of a mobile telecommunications device. In some embodiments, the priming zone and the sorting zone substantially overlap in space (e.g., the target may be presented in the same location where the prime was presented). The priming zone and the sorting zone may substantially overlap in space and a transition from the priming zone to the sorting zone may occur temporally. The system may include stored computer-executable instructions that provide the instructions for the processor to render the graphical user interface.

In another aspect, the invention relates to a method of assessing consumer perception. The method includes: (a) presenting on a graphical user interface a prime associated with a business feature (e.g., a brand, a product, a service, a package, a shelf image, an interior store image, an exterior store image, an advertising image, a price, a trademark, a service mark, and a trade dress); (b) presenting on the graphical user interface a target to be sorted by the consumer; (c) receiving an instruction from the consumer via a user input device to sort the target into a bin presented on the graphical user interface, wherein the bin is selected from at least two sorting bins presented on the graphical user interface; (d) generating consumer response data associated with the instruction from the consumer, wherein the consumer response data includes a sort time, a sort accuracy, and/or a sort intensity; (e) repeating steps (a) to (d) for a plurality of primes and targets; and (f) evaluating the consumer response data to determine the consumer's perception of the business feature.

In certain embodiments, the prime includes a logo, a trademark, and/or a service mark. Presenting the prime may include zooming in on the prime. The graphical user interface may include a priming zone and a sorting zone. In some embodiments, presenting the prime includes translating the prime through the priming zone. In various embodiments, (i) the sort time is or includes a time between presentation of the target and receipt of instructions from the consumer, (ii) the sort accuracy includes a difference between the bin and a correct bin associated with the target, and (iii) the sort intensity includes, for example, a speed of a gesture, a length of a gesture, and a volume of a vocal command. The consumer may provide the instruction by performing a gesture (e.g., pressing a key, pressing a button, swiping a finger, moving a hand, moving a head, moving an eye, speaking, and/or vocalizing).

In various implementations, the at least two sorting bins include (i) a positive bin for receiving targets perceived to be positive by the consumer, and (ii) a negative bin for receiving targets perceived to be negative by the consumer. The consumer may sort the target into the positive bin by gesturing toward the consumer with the user input device (e.g., dragging a finger toward the consumer along a touch screen). The consumer may sort the target into the negative bin by gesturing away from the consumer with the user input device (e.g., dragging a finger away from the consumer along a touch screen). In some embodiments, the target is correctly sorted into a bin when the target includes at least one attribute representing the bin. In one embodiment, the target is ambiguous, and sorting of the target provides a direct indication of the consumer's affinity toward or perception of the prime or of the target, as influenced by the prime.

In certain implementations, the method includes presenting on the graphical user interface at least a portion of the consumer response data after the instruction from the consumer is received. To evaluate the consumer response data, the method may include performing hierarchical Bayesian estimation. The method may also include presenting on the graphical user interface at least one of an accuracy gauge and a speed gauge (e.g., to make the method more like a game). The prime and/or the target may include a photograph or other personal marker of the consumer.

In another aspect, the invention relates to a system for assessing consumer perception. The system includes a computer readable medium having instructions stored thereon, and a data processing apparatus configured to execute the instructions to perform operations including: (a) presenting on a graphical user interface a prime associated with a business feature (e.g., a brand, a product, a service, a package, a shelf image, an interior store image, an exterior store image, an advertising image, a price, a trademark, a service mark, and a trade dress); (b) presenting on the graphical user interface a target to be sorted by the consumer; (c) receiving an instruction from the consumer via a user input device to sort the target into a bin presented on the graphical user interface, wherein the bin is selected from at least two sorting bins presented on the graphical user interface; (d) generating consumer response data associated with the instruction from the consumer, wherein the consumer response data includes a sort time, a sort accuracy, and/or a sort intensity; (e) repeating steps (a) to (d) for a plurality of primes and targets; and (f) evaluating the consumer response data to determine the consumer's perception of the business feature.

In certain embodiments, the system includes a communications module for transmitting the consumer response data to a remote server. The computer readable medium, data processing apparatus, and communications module may include or form components of a mobile telecommunications device. The computer readable medium may include instructions for the data processing apparatus to render the graphical user interface.

In another aspect the invention relates to a computer program product stored in one or more storage media for controlling a processing mode of a data processing apparatus. The computer program product is executable by the data processing apparatus to cause the data processing apparatus to perform operations including: (a) presenting on a graphical user interface a prime associated with a business feature (e.g., a brand, a product, a service, a package, a shelf image, an interior store image, an exterior store image, an advertising image, a price, a trademark, a service mark, and a trade dress); (b) presenting on the graphical user interface a target to be sorted by the consumer; (c) receiving an instruction from the consumer via a user input device to sort the target into a bin presented on the graphical user interface, wherein the bin is selected from at least two sorting bins presented on the graphical user interface; (d) generating consumer response data associated with the instruction from the consumer, wherein the consumer response data includes a sort time, a sort accuracy, and/or a sort intensity; (e) repeating steps (a) to (d) for a plurality of primes and targets; and (f) evaluating the consumer response data to determine the consumer's perception of the business feature.

BRIEF DESCRIPTION OF THE FIGURES

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

While the invention is particularly shown and described herein with reference to specific examples and specific embodiments, it should be understood by those skilled in the art that various changes in form and detail may be made therein without departing from the spirit and scope of the invention.

DETAILED DESCRIPTION OF THE INVENTION

Figure 1:
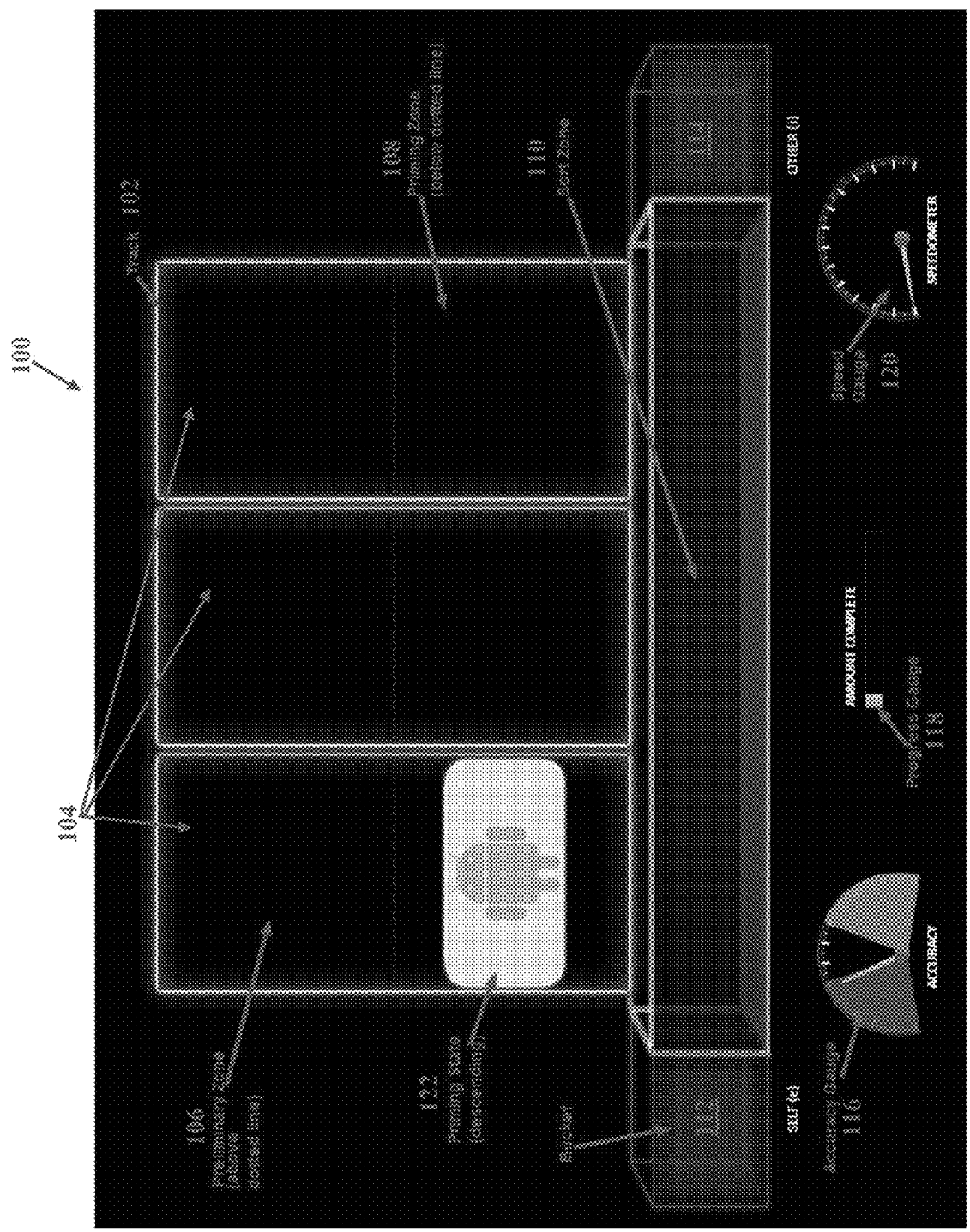
FIG. 1 is a screenshot of a system for assessing consumer perception, in which a prime and a target are displayed on a track, according to an illustrative embodiment of the invention.

It is contemplated that devices, systems, methods, and processes of the claimed invention encompass variations and adaptations developed using information from the embodiments described herein. Adaptation and/or modification of the devices, systems, methods, and processes described herein may be performed by those of ordinary skill in the relevant art.

Throughout the description, where devices and systems are described as having, including, or comprising specific components, or where processes and methods are described as having, including, or comprising specific steps, it is contemplated that, additionally, there are devices and systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

Embodiments of the systems and methods described herein may be used to assess a consumer's automatic or implicit associations (e.g., affinity or perception, which may be emotional, unemotional, valenced, non-valenced, conscious, or subconscious) toward business features, such as brands, products, services, packaging, advertising, and other items associated with companies that provide goods or services. As used herein, the terms "consumer," "individual," "user," "person," "participant," and "respondent" may be used interchangeably. In certain embodiments, as used herein, "business feature" refers to any feature of or associated with a business. The business may be, for example, a for-profit business, a non-profit business, a sole-proprietorship, a corporation, a partnership, or a cooperative. The business feature may be or include, for example, a brand, a product, a service, a package, a shelf image, an interior store image, an exterior store image, an advertisement (e.g., an advertising image), a price, a trademark, a service mark, and/or a trade dress. In some implementations, the business feature relates to an item (e.g., a word, an image, a sound, or a video) that may be used to assess a consumer's motivation (e.g., to make or not make a purchase).

In certain embodiments, the affective priming process is made up of tasks and exercises. A task is the discrete moment of a single sorting exercise. Generally, participants are exposed to a prime before completing the sorting exercise which immediately follows. However, during practice or baseline tasks, there may just be the sorting exercise without a prime preceding it. The exercise is a sum of all tasks necessary to completely test a specific group of words, categories, and primes. For example, imagine an exercise that requires sorting these six words into these two categories: fun, comfortable, and relaxing into the category of pleasant, and boring, uncomfortable and stressful into the category of unpleasant. In addition, participants may be primed with three different brands, WINDOWS®, APPLE®, and LINUX®. In order to assure that all possible combinations of primes and sorting tasks are seen, this exercise would require 18 tasks, six for each possible prime. For every task, the system may record four data points: a) the amount of time for the user or respondent to complete the task, b) whether the respondent made an error, c) which target the respondent sorted, and d) which prime the respondent saw before the sorting exercise.

The experience is preferably designed to be "game-like" in appearance, while still capturing the essential experimental data on the subconscious. In various implementations, the systems and methods described herein heighten engagement through incorporation of game design elements, multiple behavioral interaction measures, and advanced experimental design, combined with hierarchical Bayesian estimation subconscious associations.

In general, the systems and methods may be used as market research tools for measuring implicit associations between primes (which can be any visual or auditory stimulus) and other concepts (e.g., attributes, emotions, attitudes, etc.) by utilizing principles of affective priming. The systems and methods are experimentally sound while also incorporating numerous elements characteristic of games—including movement, urgency, goal-setting, and success and failure feedback—to increase user engagement. For example, the user may be provided with information about the user's speed and accuracy (e.g., in the form of speed and/or accuracy gauges) when using the systems and methods. Such feedback improves user focus and makes the user's experience more enjoyable, while also improving measurement accuracy.

The systems and methods include several possible variations of play per step in the prime, target, and sort workflow. For example, with respect to the prime, blank squares may descend from the top to the bottom of a screen in one of three randomly assigned tracks (or simply appear in a "non-track version"). As the blank squares descend, priming images (e.g., photos, drawings, and/or words) appear on their faces for a predefined time ("priming zone") before the squares land in a sorting zone at the bottom of the screen. Once in the sorting zone, the user is presented with a sorting task. The priming image is replaced with a target word, image, or sound, which the user then tries to sort into the correct category on the left or right sides of the screen by pressing a predefined keyboard key (for instance, "e" or "i" to signal left or right).

In one embodiment, squares appear to approach you by scaling larger in size. As the squares approach, priming images appear on their faces for a predefined time ("priming zone") before the images stop in a sorting zone at the forefront of the screen. In some embodiments, squares simply appear full size at the forefront of the display.

The system may play an audio track that appears to approach the participant by increasing in volume through the priming duration. A visual cue (such as a speaker icon emitting sound waves) informs the user that the prime is audial. Alternatively, an audio track may play at a constant volume throughout the priming duration.

With respect to the target, visual targets such as text, an image, or a video may be shown immediately after the priming duration, after which it is ready for sorting. For audial targets, the audial stimulus is played through the device's speaker while a visual cue (such as a speaker icon emitting sound waves) appears in the forefront of the display inside a blank target image informing the user the target to be sorted is audial. Arrows pointing to each of the two categories into which the user must sort the target appear at the top and bottom of the display.

After the target appears, the systems and methods may present a sorting task, during which the user tries to sort the target into the correct category through some behavioral indication. Sort can be done in many ways depending on the user's device capabilities (e.g., the user input device) and/or the project's specific configuration settings. For example, sort may be performed using: (i) a keyboard with designated keys to be pressed, (ii) a nod or shake of the participant's head to sort into positive or negative category, respectively, (ii) a swipe toward a specified category on a touchscreen display, (iv) verbal positive/negative cues (e.g., "yes"/"no," "up"/"down," "toward"/"away," respectively), (v) a tilt of a device toward or away to choose a positive or negative category, respectively, and/or (vi) movement of the participant's eyes toward or away from a visual icon representing a category.

In various embodiments, the systems and methods record a length of time between the square entering the sort zone and the participant sorting it into a category. The systems and methods may also record whether the participant sorts the square correctly initially. Finally, the systems and methods may record which target image or prime appeared on the square before the square entered the sort zone, and the image or word that was sorted, allowing analysis of the impact of the priming effect on the response time associated with the target stimulus during the sorting task.

As an example, the systems and methods described herein may be used to assess a consumer's affinity toward or perception of two different products: Product A and Product B. To make this assessment, the systems and methods utilize one prime that shows Product A (e.g., an image, sound, or trademark associated with Product A) and another prime that shows Product B (e.g., an image, sound, or trademark associated with Product B). Following the presentation of each prime, a target (e.g., a word, sound, or image) is presented to the consumer, and the consumer must sort the target into either a "positive" bin or a "negative" bin. For example, one target may be the word "good," which is a positive term and therefore correctly sorted into the positive bin. Another target may be the word "bad," which is a negative term and therefore correctly sorted into the negative bin. Once each target is presented, the systems and methods record the time it takes the consumer to select a bin for sorting the target. For the purposes of this example, we assume the consumer likes (either consciously or subconsciously) Product A but does not like Product B.

Table 1 illustrates the expected results for each combination of the two primes and the two targets for this example. As the table indicates, the consumer will likely sort the target more quickly when the prime and the target are consistent (e.g., both positive) than when the prime and the target are inconsistent (e.g., one positive, one negative). For example, when the prime shows Product A (the product the consumer likes) and the target is positive (i.e., the word "good"), the consumer will sort the target quickly. By contrast, when the prime shows Product B (the product the consumer does not like) and the target is positive, the consumer will sort the target more slowly. The table also indicates that the consumer is more likely to sort the target correctly when the prime and the target are consistent than when the prime and the target are inconsistent. For example, when the prime shows Product B and the target is negative, the consumer is more likely to sort the target correctly. By comparison, when the prime shows Product A and the target is negative (i.e., the word "bad"), the consumer is more likely to sort the target incorrectly (e.g., sort the word "bad" into the positive bin). The premise of the test is that if the prime evokes associations consistent with the target, the consumer will make judgment on the target more quickly and more accurately, and if the prime evokes associations inconsistent with the target, the consumer will be slower and less accurate in judgment.

TABLE 1

Expected results for example prime and target combinations.

| Prime | Target | Sort Time | Likelihood of Sorting Error |
|---|---|---|---|
| Product A | "Good" | Shorter | Less likely |
| Product A | "Bad" | Longer | More likely |
| Product B | "Good" | Longer | More likely |
| Product B | "Bad" | Shorter | Less likely |

In some embodiments, the systems and methods also measure the intensity with which the consumer sorts the target, to further assess the consumer's perception of a product, service, brand, advertisement, etc. For example, the systems and methods may measure a velocity associated with a gesture (e.g., dragging a finger along a touch screen) performed during the sort task. Other indicators of sort intensity may include the user's rate of pupil dilation (e.g., as measured with a camera), the length of a gesture (e.g., the length of a swipe along a touch screen), and the volume of a vocal command (e.g., as measured with a microphone). In general, when the prime evokes associations consistent with the target, the consumer's sort will be more intense (e.g., a faster gesture, a longer gesture, faster pupil dilation, and/or a louder vocal command), and if the prime evokes associations inconsistent with the target, the consumer's sort will be less intense (e.g., a slower gesture, a shorter gesture, a slower pupil dilation, and/or a quieter vocal command).

The systems and methods described herein may also utilize targets that are ambiguous and provide an assessment of the user's association with the prime. For example, a target may include an ambiguous word (e.g., the word "neutral"), which does not belong in any particular sorting bin. When the user is presented with a prime followed by the ambiguous target, the user's judgment about how to sort the target may be used to assess the user's perception of the prime. For example, if the user is presented with Product A (a product the consumer likes), the user will likely sort the ambiguous target into the positive bin. Although the target is not associated with either bin, the user's judgment, speed to judgment, and/or intensity of judgment may be used to measure the implicit association between the prime and the bins.

While the examples presented herein typically include two bins, the systems and methods are not limited to the use of two bins. Any number of bins may be desirable. For example, the systems and methods may use zero, one, two, three, four, five, or more bins. In one example, the system utilizes four bins, which one bin on each side of a rectangular display screen. In the case of vocal recognition, the graphical user interface may not depict any bins. In general, a bin is a destination or option that receives the result of a sort judgment made by the user. In a general sense, the task of sorting may be considered to be a cognitive action (i.e., a decision made by the user).

Additionally, while the examples above relate primarily to determining a user's perception of something (e.g., a product), the systems and methods may be more generally applied to measure associations between any two concepts. For example, the systems and methods may be used to assess a consumer's associations with brand attributes that may or may not be valenced.

In various embodiments, the systems and methods are not limited to the use of bins that may be characterized as being only "positive" or "negative," as described for the examples above. In general, the systems and methods may utilize any suitable bins or bin labels for measuring any type of attribute, which may or may not be positive or negative. Exemplary attributes for products and services include, for example, stylish, not stylish, high quality, low quality, bold, and weak.

FIG. 1 is a screenshot of a track version 100 of the systems and methods, in accordance with certain embodiments of the invention. To avoid influencing users with extraneous information, the displayed content of the systems and methods is aesthetically austere and stylishly simple, made primarily of clean lines.

In the depicted embodiment, the track version 100 occupies approximately one third of the screen and is center justified. A track 102 runs top to bottom in the center and is vertically subdivided into three equally sized parallel lanes 104. The track 102 is also horizontally divided into three zones. In a preliminary zone 106, descending squares 122 are blank and descend at a constant velocity. In a priming zone 108, the squares 122 continue descending at the same velocity; however, a priming stimulus or prime (e.g., text, image, video, or sound) is revealed on the square's face (for all but sound, which is emitted from a speaker). In the sort zone 110, the square 122 stops, and the priming stimulus is replaced with another stimulus or target (e.g., text, image, video, or sound), which needs to be sorted into one of the buckets or bins. The buckets are on the left and right sides of the track 102, below each of which is a category label. In this case, the buckets include a "self" bucket 112 and an "other" bucket 114.

Below the sort zone 110 are an accuracy gauge 116, a progress gauge 118, and a speed gauge 120. The accuracy gauge 116 begins at a pre-determined fullness (e.g., 50%). As the participant sorts correctly, the accuracy gauge 116 could fill completely, but as the participant makes mistakes, the accuracy gauge 116 empties. The progress gauge 118 begins empty and fills as tasks are completed, giving the participants a running sense of how many more tasks remain before completion. Much like the accuracy gauge 116, the speed gauge 120 begins partially full and if the participant answers quickly, the fullness of the speed gauge 120 increases. However, if the participant slows down, the fullness of the speed gauge 120 decreases.

As the task occurs, the squares 122, blocks, or other shapes descend from the top to the bottom, randomly assigned to one of the three lanes 104. Notably, there can be multiple squares 122 on the screen at a time, to heighten urgency for the participant. While in the preliminary zone 106, the stimulus or prime is not revealed because the square 122 is in its pre-prime state. As the square 122 enters the priming zone 108, the priming stimulus (e.g., text, image, video, or sound) is revealed—this is the priming state. After passing through the priming zone 108 and entering the sort zone 110, the priming stimulus is replaced by the target stimulus which the participant must sort with some behavioral indication on a user input device (e.g., striking a pre-specified key or button, swiping a touch screen, nodding or shaking the participant's head, etc.)—this is the sorting state. If the participant has sorted correctly, the participant is cued visually and/or auditorily that the target is in the correct bucket. If the participant has sorted incorrectly, the participant is cued visually and/or auditorily that the target was sorted into the incorrect bucket. In the incorrect judgment case, the participant then needs to correct the error by issuing the correct gesture and subsequently sorting into the correct bucket.

If the square 122 enters the sort zone 110, yet the participant does nothing, the square 122 will either expire after a predetermined duration or will remain there until correctly sorted. Accuracy and speed gauges will decline.

Preferably, only one task occurs on the screen at a time, such that only one priming stimulus is unmasked at a time, to reveal its respective target stimulus. This may be assured in one of two ways. In Option 1, a length of time it takes to cross the preliminary zone 106 will be equal in length to an expiration time in the sort zone 110. Therefore, no other square 122 will reach the priming zone 108 until the previous sorting task has expired. In Option 2, squares 122 can fall more quickly than the sorting zone can expire, but no other squares 122 are unmasked in the priming zone 108 as long as a square 122 remains unsorted in the sort zone 110. If an unmasked square 122 does reach the sort zone 110 while another square 122 is waiting in the sort zone 110, the unmasked square 122 will stall at the end of the track 102 until the sort zone 110 is cleared. At that point, the unmasked square 122 will enter the sort zone 110 and be assigned a random word or image for the participant to sort. In certain embodiments, this will be a "ghost task" that has no bearing on the completion of the exercise and occurs only to make sure that participants maintain their sense of urgency and engagement. Accordingly, in various embodiments, one of these two options is utilized to assure that only one task occurs on-screen at a time.

In certain embodiments, to assure validity, all squares 122 fall or approach the participant at a constant velocity. The length of time for the fall/approach can be specified in a back-end setup utility, but is typically about three seconds. The length of time a square 122 spends in the priming zone 108 is generally variable as well, and may be any portion of the fall/approach time (e.g., less than 3 seconds). For example, the preliminary zone 106 may take 2.5 seconds to traverse, meaning that the square 122 will be in the priming zone 108 for 0.5 seconds before entering the sort zone 110 and becoming a task. Alternatively, the preliminary zone 106 may last just 1 second, and the priming zone 108 may last 2 seconds. The longer the length of either zone, the greater the proportion of the track 102 or zooming percentage increase it occupies visually on the screen, during the fall or approach.

In the embodiment depicted in FIG. 1, it is likely that, at any time, multiple squares 122 will be descending in different lanes 104 on the track 102. It is important, however, that only one real prime and sorting task occurs at a time. As discussed above, there are two options for achieving this.

With Option 1, the length of time before the sorting task expires in the sorting zone will be equal to the length of time that it takes a block to traverse the preliminary zone 106. In addition, the second block or square 122 will appear only when the first block 122 reaches the sorting zone. This means that, while it will be possible for more than one block 122 to appear on screen, it will be impossible for one to reach the priming zone 108 while a sorting task remains uncompleted. A possible downside of this method is that participants may feel less urgency, because the velocity and density of blocks 122 will be relatively low.

With Option 2, whenever a square 122 for a true task is unmasked (e.g., in its priming state and traversing the priming zone 108, or awaiting sorting in its sorting state in the sort zone 110) any blocks 122 that enter the priming zone 108 will remain blank and become ghost tasks. If a ghost task reaches the sort zone 110 while another task is waiting to be sorted, it will stall at the end of the track 102 until the sort zone 110 is clear. Then, once the ghost task enters the sort zone 110, the ghost task will switch to a random word, image, or sound to be sorted. However, no data will be recorded for the ghost task. In effect, while an exercise may only have 18 target tasks, users may perform several more ghost tasks as well, all depending on how quickly they sort. Of course, in the working example, every participant completes every target task.

A benefit of Option 2 over Option 1 is that the ghost tasks enable the density of blocks 122 to be controlled using a congestion option, which allows more than two blocks 122 to be on the screen at once. This may be used to greatly heighten urgency and also mask the lag time between true tasks by keeping participants constantly busy. A downside of the Option 2 approach is that it leads to more work for the participant, much of which is not recorded or analyzed. Option 2 is also generally more complex and difficult to implement than Option 1.

The track version 100 described above may be implemented on any type of device, but is preferably implemented on laptop or desktop devices having physical keyboards. Below, a second, non-track implementation of the systems and methods is described that is preferably implemented on devices featuring touchscreen displays that accept behavioral inputs, such as touch screen swipes, vocal commands, and behavioral movement detection. In general, however, the systems and methods may be implemented on any type of device capable of presenting information to a user and receiving feedback from the user. Examples of suitable devices include, for example, desktop computers, laptop computers, workstations, tablet computers, mobile phones, and similar devices.

Figure 2:
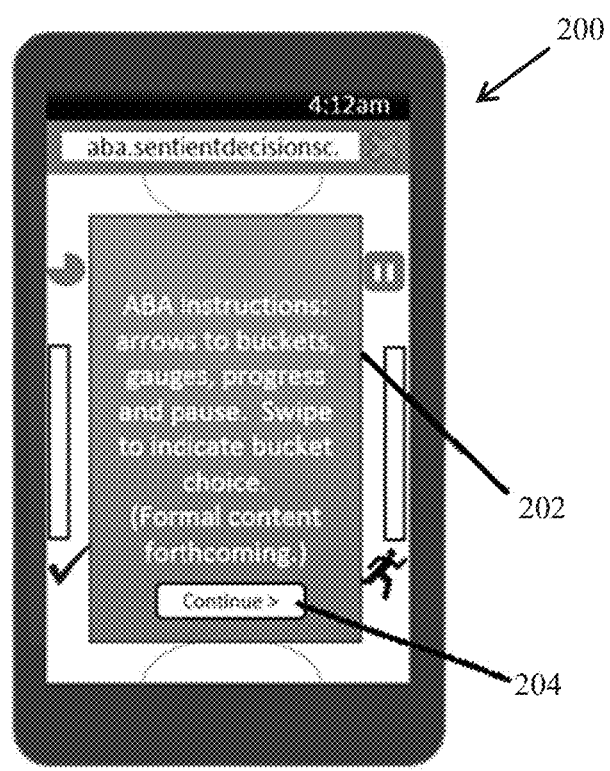
FIGS. 2 and 3 are screenshots of a mobile system for assessing consumer perception, in which instructions and gauges are displayed, according to an illustrative embodiment of the invention.
Figure 3:
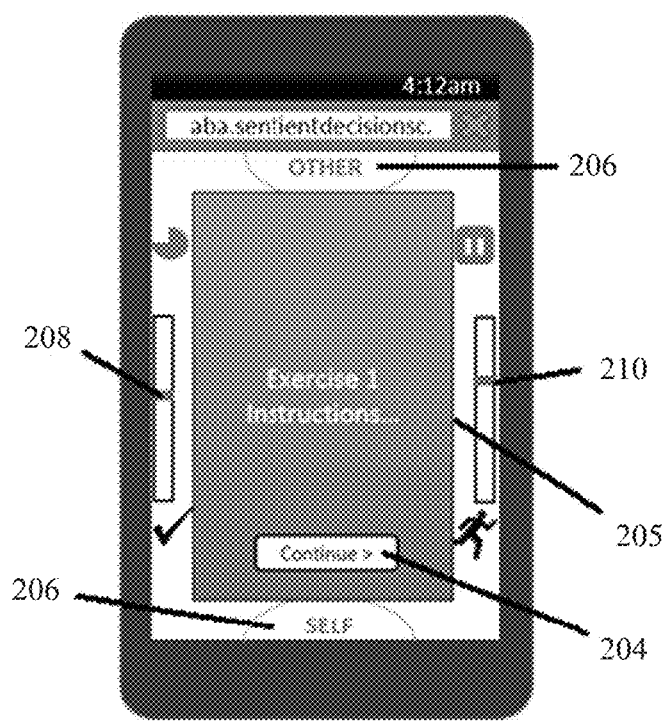
Figure 4:
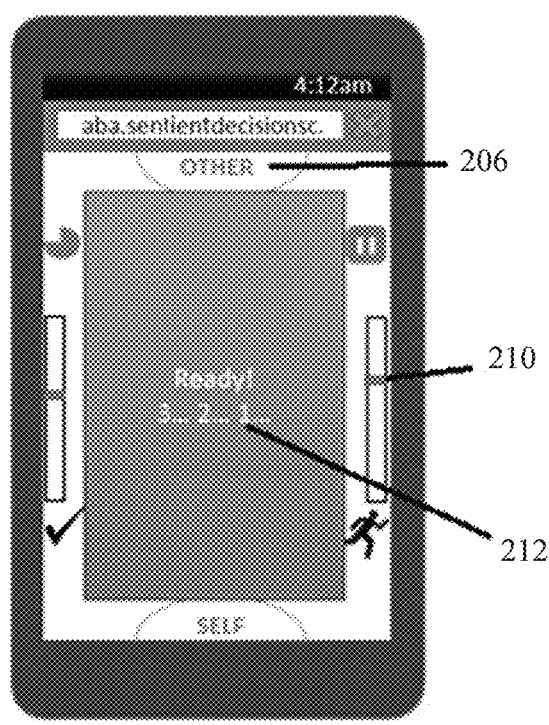
FIG. 4 is a screenshot of a countdown timer for the mobile system of FIGS. 2 and 3, according to an illustrative embodiment of the invention.

FIGS. 2 through 12 include schematic screenshots of a non-track version 200 of the systems and methods, as implemented on any display device, such as a mobile phone, in accordance with certain embodiments of the invention. Referring to FIG. 2, a first screen 202 that appears includes general instructions on use of the systems and methods. The first screen 202 or general information window may overlay other controls on the display. A continue button 204 is provided that, when selected by the user, takes the user to a second screen 205 with exercise instructions, as depicted in FIG. 3. On the second screen 205, buckets or bins 206 are displayed at top and bottom edges of the screen 205, and the buckets 206 are labelled (e.g., with "self" and "other"). An accuracy gauge 208 and a speed gauge 210 are displayed along the left and right sides of the screen, respectively, and mean values appear on these gauges. The exercise instructions may be saved and/or accessed in an administrator portal or from a local or remote storage device. The user may access the next screen by selecting the continue button 204. Referring to FIG. 4, on the next screen (i.e., a ready screen), a countdown timer 212 is displayed to inform the user that a session or exercise is about to begin. The timer 212 may begin at 3 seconds and count down to zero, at which time the session begins.

Figure 5:
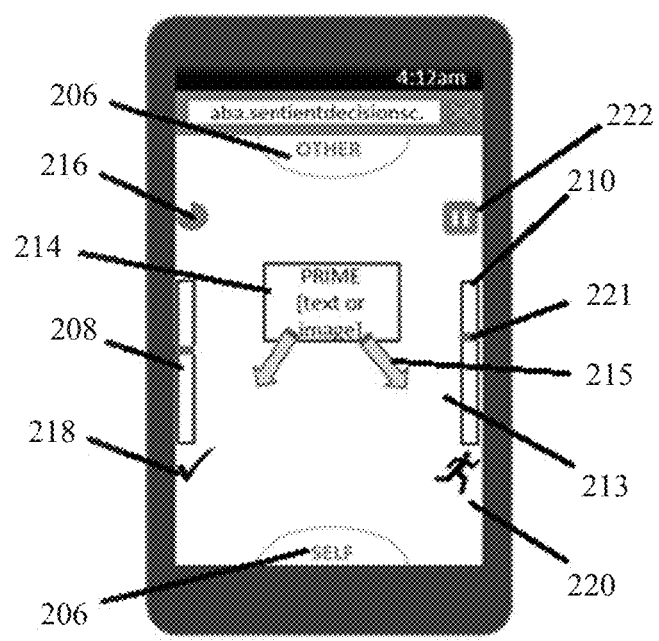
FIG. 5 is a screenshot of a prime being presented and increasing in size for the mobile system of FIGS. 2 and 3, according to an illustrative embodiment of the invention.
Figure 6:
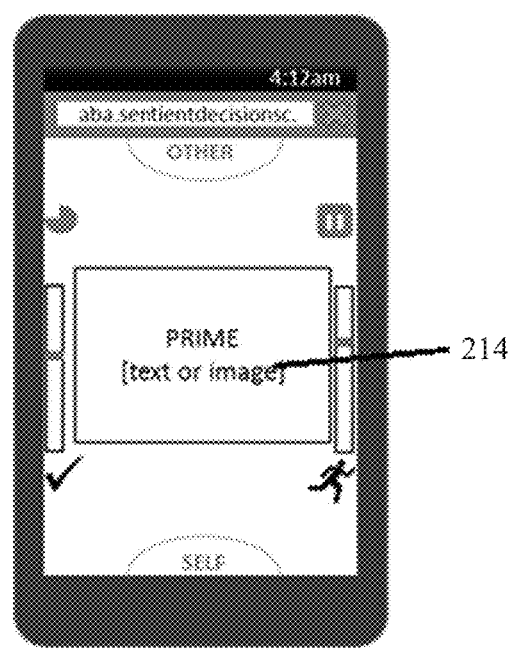
FIG. 6 is a screenshot of the prime of FIG. 5 after it has reached full size, according to an illustrative embodiment of the invention.

Referring to FIG. 5, after the countdown on the ready screen, a priming screen 213 is displayed in which a priming stimulus or prime 214 (e.g., text or an image) is displayed in the center of the priming screen 213 in a small window that grows or expands to a larger size, giving the impression that the prime 214 is moving toward the user, as indicated schematically by zooming arrows 215. For example, the prime 214 may scale from half size to full size in accordance with a specified priming duration, to achieve a desired rate of zooming. As depicted, the screen includes a progress indicator 216 showing the percentage of total tasks completed for the current session or exercise. The accuracy gauge 208 and speed gauge 210 are labeled with an accuracy icon 218 and a speed icon 220, respectively, and display mean values 221 for accuracy and speed. The bins 206 at the top and bottom of the screen may have backgrounds that are semi-transparent. The user may pause the session by selecting a pause button 222. FIG. 6 shows the priming state after the prime 214 has reached full size.

Figure 7:
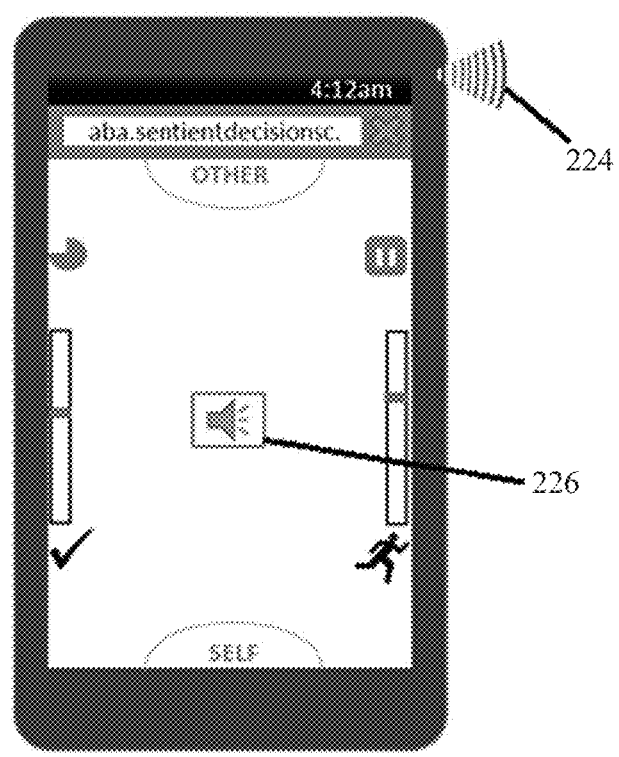
FIG. 7 is a screenshot of an auditory prime for the mobile system of FIGS. 2 and 3, according to an illustrative embodiment of the invention.
Figure 8:
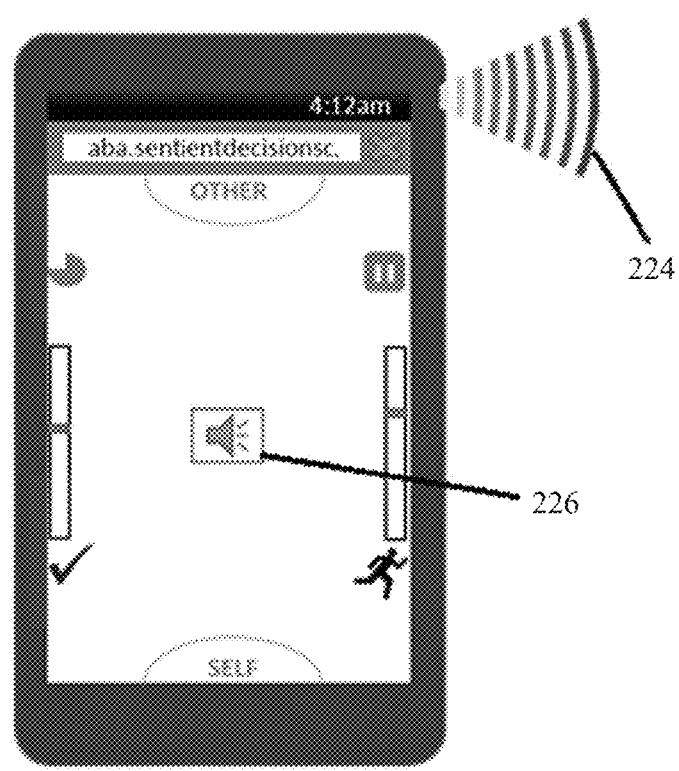
FIG. 8 is a screenshot of the auditory prime of FIG. 7 after the auditory prime has increased in volume, according to an illustrative embodiment of the invention.

Referring to FIGS. 7 and 8, in some instances, an auditory prime 224 is provided that begins at a lower volume (FIG. 7) and increases to full volume (FIG. 8) through the priming duration. A speaker icon 226 is displayed on the screen to inform the user that the prime is auditory. The auditory prime 224 may be generated, for example, with internal or external speakers, or with headphones connected to the device.

Figure 9:
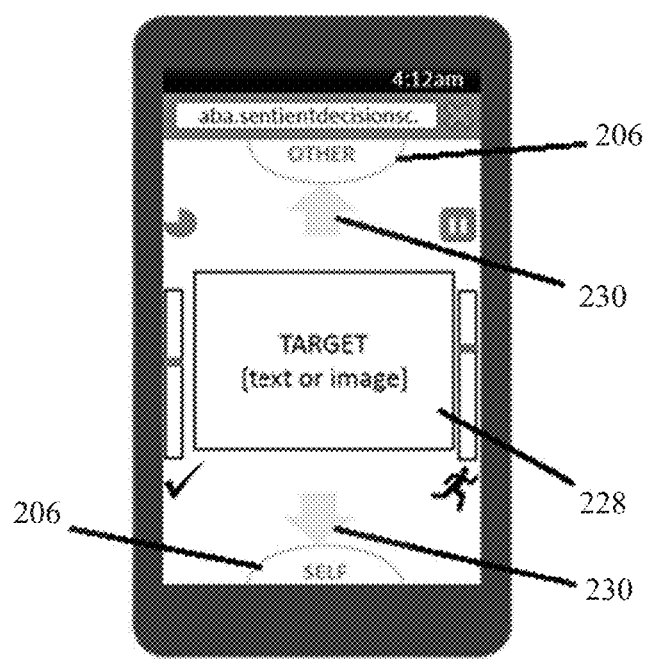
FIG. 9 is a screenshot of a target being presented for the mobile system of FIGS. 2 and 3, according to an illustrative embodiment of the invention.
Figure 10:
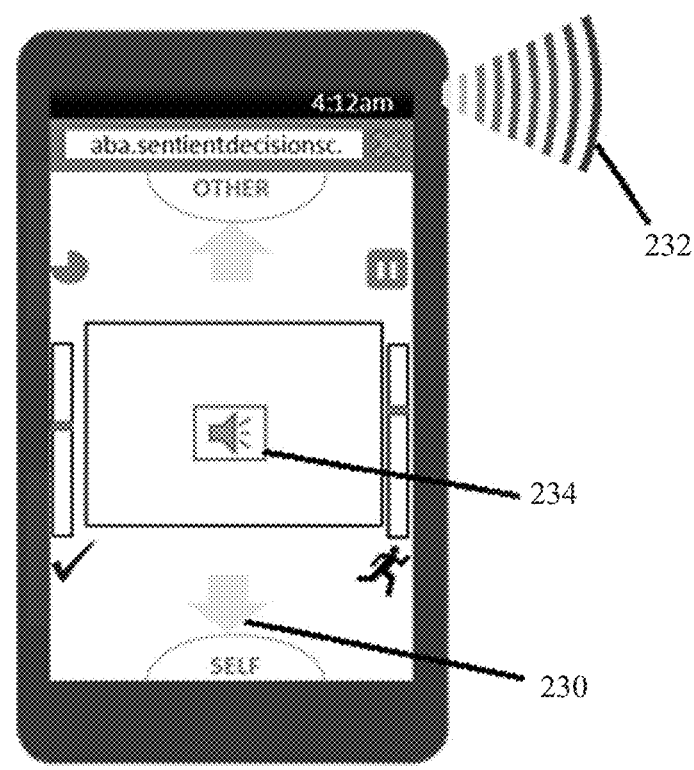
FIG. 10 is a screenshot of an auditory target for the mobile system of FIGS. 2 and 3, according to an illustrative embodiment of the invention.
Figure 11:
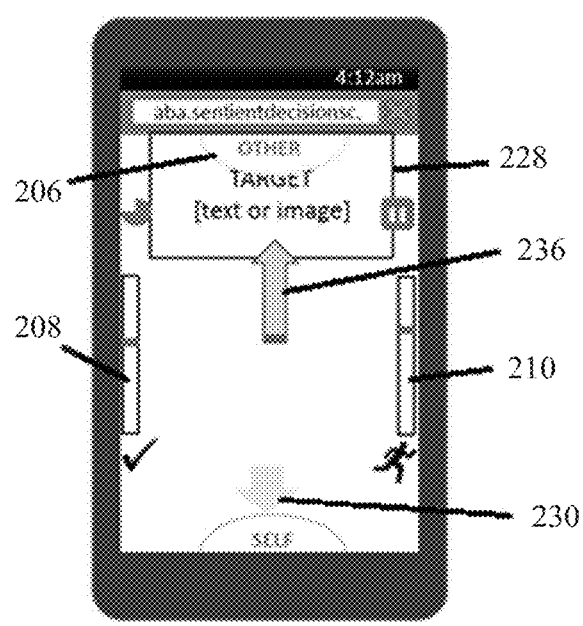
FIG. 11 is a screenshot of the mobile system of FIGS. 2 and 3, after a user has provided a gesture to sort the target into a correct bin, according to an illustrative embodiment of the invention.

Referring to FIG. 9, when the priming state is complete, the system enters the sorting state in which a target 228 (e.g., text or an image) is displayed in the same location where the prime 214 was previously located. The target 228 is preferably displayed at the same size and location as the prime, with no zooming or animation. Arrows 230 are displayed above and below the target 228 indicating that the target 228 is to be sorted into one of the two bins 206 at the top and bottom of the screen. Referring to FIG. 10, in the case of an auditory target 232, a speaker icon 234 is displayed (e.g., in a blank image) in the target area to inform the user that the target 228 is auditory. As with the auditory prime 224, the auditory target 232 may be generated with internal speakers, external speakers, or headphones connected to the device.

Once the target 228 (or the auditory target 232) is presented, the system awaits the user to sort the target 228 into one of the two bins 206 via any of the aforementioned methods. For example, referring to FIG. 11, the user may sort the target 228 by gesturing or swiping along a touch screen in the direction of one of the arrows 230. If the user selects the correct bin 206, the target 228 slides off the screen in the direction of the correct bin 206 and fades out (e.g., in about 0.25 seconds). A sound may also be played to inform the user that the target 228 was correctly sorted (e.g., the device may say "correct"), and the correct bin 206 may be temporarily highlighted (e.g., in a bright white or green color for about 0.25 seconds). As the target 228 slides off the screen, the target 228 is preferably positioned behind the bin area and all other features on the screen, with the exception of the arrows 230. As depicted, when the user provides an upward gesture 236, the entire target 228 or target window slides toward the top bin 206 and fades out. The accuracy gauge 208 and speed gauge 210 are updated according to the accuracy and speed of the sort.

Figure 12:
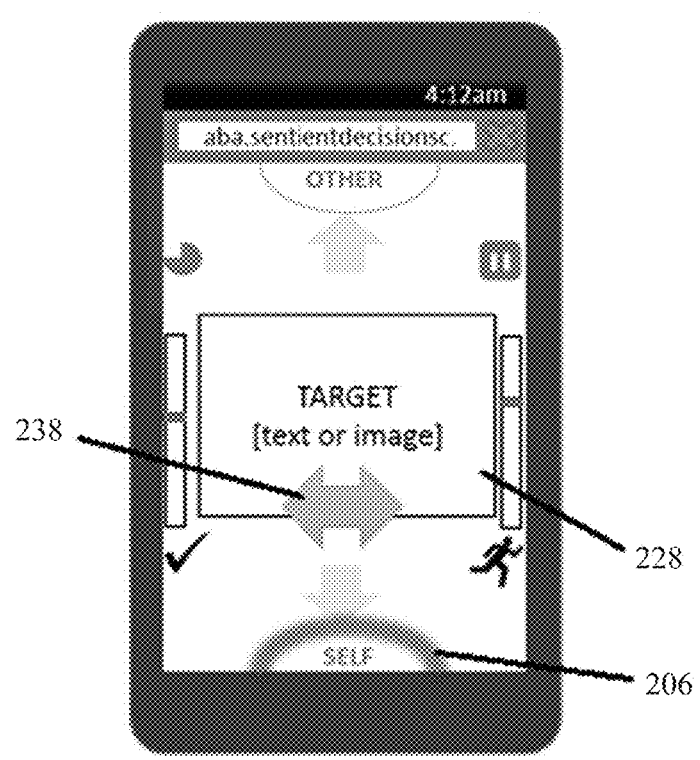
FIG. 12 is a screenshot of the mobile system of FIGS. 2 and 3, after a user has provided a gesture to sort the target into an incorrect bin, according to an illustrative embodiment of the invention.

Referring to FIG. 12, when the user gestures toward the incorrect bucket 206 during a sort task, the target 228 may shake or oscillate back and forth, in a horizontal direction 238, two or more times, and/or the incorrectly chosen bucket 206 may glow red, to indicate the target 228 was not sorted correctly. A sound indicating the target 228 was sorted incorrectly may be played (e.g., the device may say "incorrect").

Figure 13:
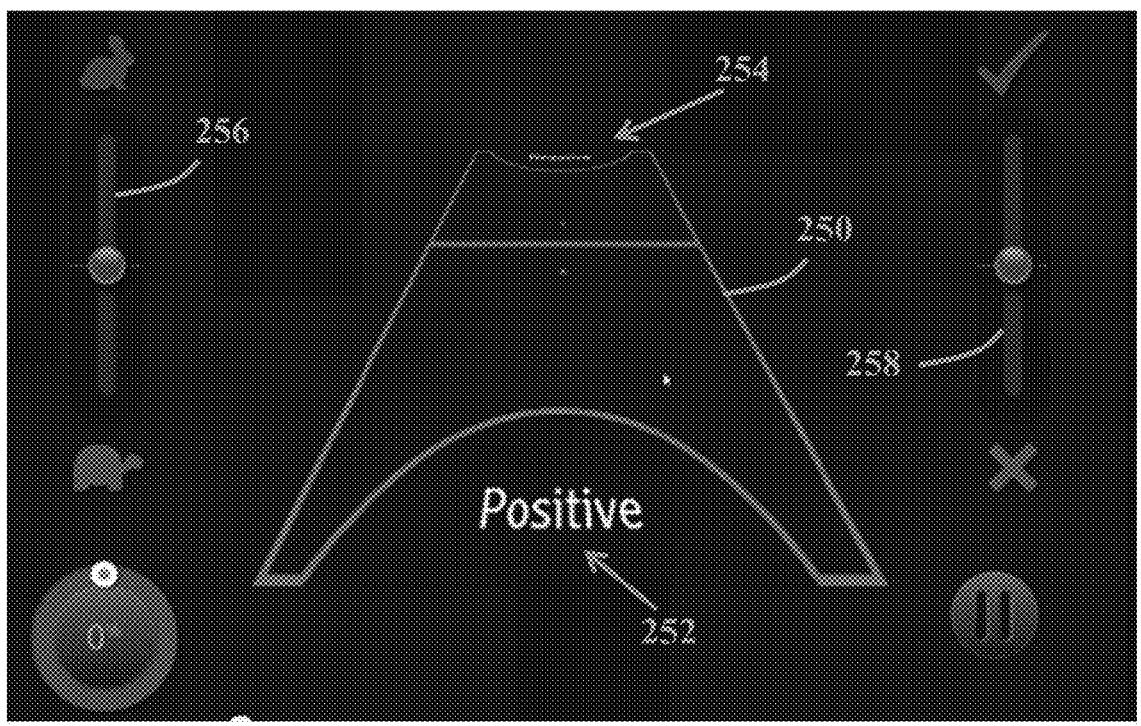
FIG. 13 is a screenshot of a system for assessing consumer perception, in which bins are displayed on opposite ends of a three-dimensional surface having one end that appears to be close to the user and an opposite end that appears to be far from the user, according to an illustrative embodiment of the invention.

Referring to FIG. 13, in certain implementations the prime and target are presented on a three-dimensional depiction of a surface (e.g., a shuffleboard surface) in which a positive bin appears to be close to the user and a negative bin appears to be far from the user. To sort a target as positive, the user provides a gesture consistent with pulling the target toward the user and the positive bin. For example, the user may drag a finger along a touch screen toward the user. To sort a target as negative, the user provides a gesture consistent with pushing the target away from the user, toward the negative bin. Advantageously, the three dimensional depiction of the surface and bins improves accuracy by being consistent with the user's tendency to pull desirable, positive objects toward the user and push undesirable, negative objects away from the user. Speed and accuracy gauges are updated after each task, according to the speed and accuracy of the user's sorting performance.

In general, each task in an exercise preferably occurs in a random order. This is experimentally imperative, because it helps correct for learning effects and order effects. In addition, if there are multiple exercises, the research designer should be able to randomize exercises as well. Again, this will guard against learning effects as users or participants improve at the systems and methods and attempt to predict correct responses to upcoming tasks.

One important form of randomization necessary for the administration of large studies with numerous participants, tasks, and exercises is task assignment randomization. Accordingly, the systems and methods described herein may randomly assign a proportion of all tasks to each participant. For example, consider a study with 6 exercises and a minimum of 240 tasks per exercise. It would quickly become a burden for a single participant to complete a study that included all potential tasks. With task assignment randomization, the proportion of all tasks that a single participant will complete may be specified. For example, if task assignment randomization were set to random 50 percent, each participant may complete half the total tasks in the study. An important component of this type of randomization is the ability to specify complete counterbalancing of task presentation so that the same number of participants complete each task. For example, in a study with 800 participants, with task assignment randomization set at 50 percent with full counterbalancing, there would be 400 complete data points for each task. In a study with 1,000 participants, and this option set at 80 percent, there would be 800 complete data points per task.

In various embodiments, the systems and methods described herein accommodate user input techniques that resemble a participant's natural approach and avoidance reactions. For example, a user may signal approach by swiping down (toward the user) on a touchscreen, tilting a mobile device toward the user's body, nodding the user's head up and down, and/or providing a positive audio response (e.g., "yes"). Likewise, a user may signal avoidance by swiping up (away from the user) on a touchscreen, tilting a mobile device away from the user's body, shaking the user's left to right, and/or providing a negative audio response (e.g., "no").

Another important component of the systems and methods described herein is the capability for dynamic primes. With dynamic primes, the prime shown before the sorting tasks may not be the same for all users or participants. Generally, the prime would be altered to reflect a prime that is uniquely relevant to the participant. For example, a participant may go through a purchase exercise where the participant makes a selection of a product from a wide array of options. After finishing the exercises with their choices, the participant may then participate in a session where the products that the participant just purchased/selected would be the primes for their exercise. This capability may make it necessary for the systems and methods to select a specific prime from a list dependent on a unique code per prime and to report the prime that users saw within the exported data set.

In general, there should be a distinct separation between a game front-end and a back end utility that specifies the systems and methods. In a simple-to-use graphical interface, a researcher should be able to specify all primes (including the ability to reference images) to be tested, as well as all categories and their constituent words, randomization, and the number of tasks. In addition, if a study demands multiple exercises, the researcher may specify this as well.

Referring again to FIG. 1, the track version 100 may include a variable track speed feature that allows the researcher to either increase or decrease, from the default of 3 seconds, the length of time it takes a block to fall from the top of the track 102 to the sort zone 110. This feature may also include an option for increasing or decreasing the length of the priming zone 108 relative to the length of the entire track 102.

The systems and methods may also include a repeated measures option that allows the researcher to design an exercise that performs each task more than once (in effect, increasing an 18-task exercise to 36 tasks for 2 repeated measures, or 54 for 3 repeated measures, etc.). Additionally, the track version 100 may include a congestion option that allows the researcher to adjust the density of blocks to fall. The congestion option may be used to increase the number of possible blocks on the screen, effectively increasing the urgency of the exercise. By proxy, this may also increase the number of ghost tasks a participant will perform in the course of completing all true tasks. Once the various options are set by the researcher, a back-end utility of the systems and methods may generate a front-end that can be imbedded in or linked to a web-based survey instrument.

In certain embodiments, once a study is out of field (e.g., an exercise is complete), the systems and methods export the data from the study. There is generally a data point for every true task within the study, from all exercises, with all ghost tasks excluded. In cases where a proportion of tasks less than 100% is selected, the data file may include blank cells instead of data for those tasks not selected as variables. The variable name may specify the category, word or image, and prime represented by the task, and may report response time (e.g., to four decimal places). Export options include, for example, fixed-width ASCII files, excel workbooks, SAS, and SPSS workbooks.

After the user or respondent has completed a session, the systems and methods may produce a pop-up results screen that provides feedback on the respondent's implicit associations. The pop-up results screen may simply plot the respondent's results in a graphic, based on a formula that calculates a percentile ranking of the respondent's brand perceptions relative to a total population's perceptions.

The formula preferably generates an individual "z-score," using the following form:

$$IZ = \frac{X - \text{Grand Mean}}{\text{Grand Standard Deviation}},$$

where IZ is the individual z-score, X is a "score" for the individual (e.g., either a sum or average of individual data points), Grand Mean is an average score from a database (e.g., a supplied constant or a dynamically calculated average from a live database), and Grand Standard Deviation is a standard deviation from a database (e.g., a supplied constant or a dynamically calculated standard deviation from a live database). The z-score is then compared to the z-score table of distribution of ranks, to produce an individual rank (IR) which may be plotted in the graphic. For example, a z-score of 1.0=the 84th percentile rank; a z-score of −1.0=the 16th percentile rank; a z-score of 0=the 50th percentile rank, and so on.

Figure 14:
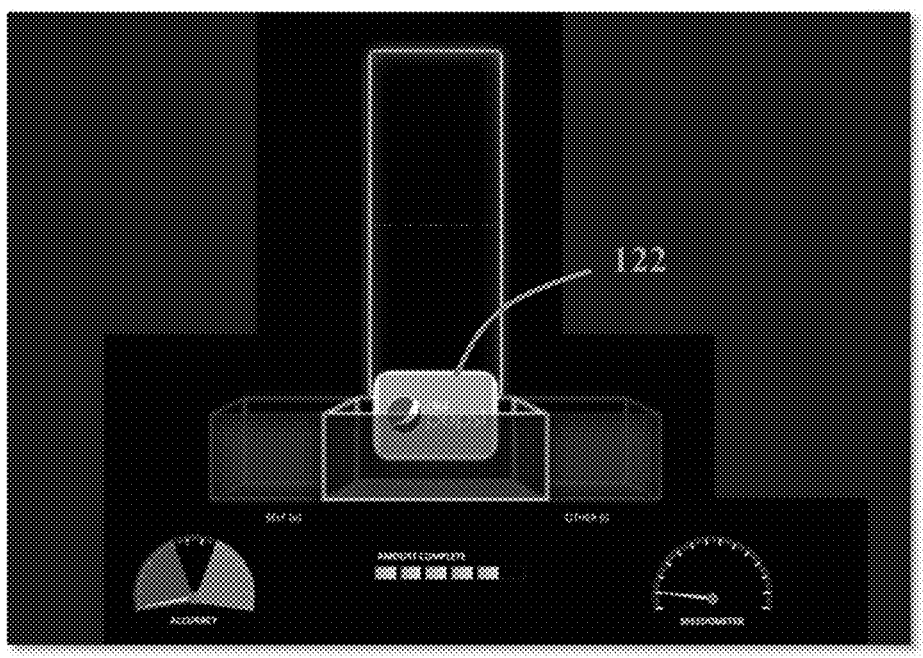
FIG. 14 is a screenshot of a system for assessing consumer perception that includes a track and three-dimensional representations of bins for receiving targets sorted by the user, according to an illustrative embodiment of the invention.
Figure 15:
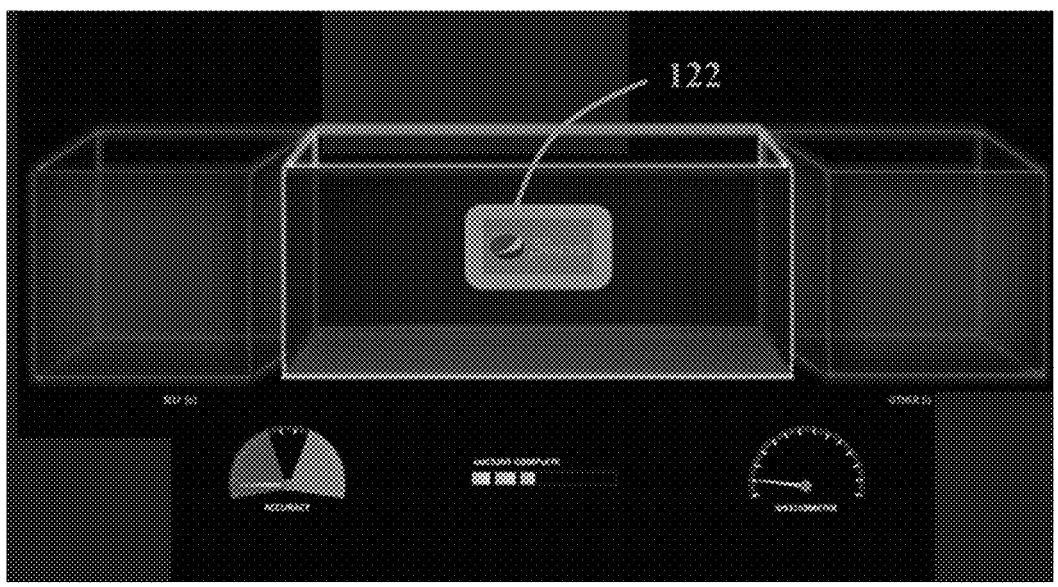
FIG. 15 is a screenshot of a system for assessing consumer perception that includes three-dimensional representations of bins for receiving targets sorted by the user, according to an illustrative embodiment of the invention.

Referring to FIGS. 14 and 15, in various embodiments, the squares or blocks 122 are scaled to achieve a 3D effect. The squares 122 preferably appear to be moving toward the user or participant by scaling the size of the blocks until the sort capability is enabled.

Figure 16:
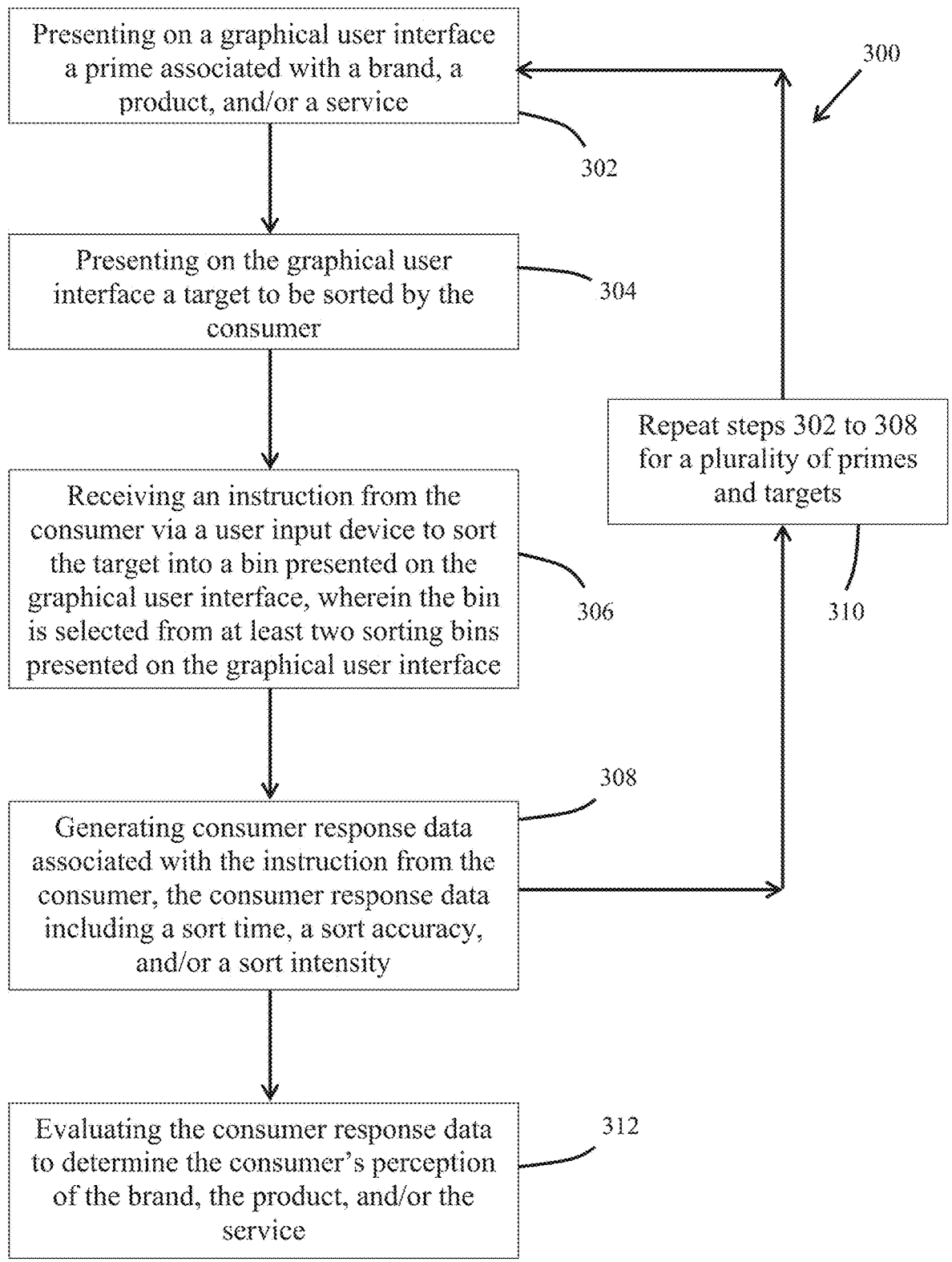
FIG. 16 is a flowchart of a method for assessing consumer perception, according to an illustrative embodiment of the invention.

FIG. 16 is a flowchart of a method 300 for assessing consumer perception, in accordance with certain embodiments of the invention. At step 302, a prime associated with a brand, a product, and/or a service is presented on a graphical user interface. At step 304, a target to be sorted by the consumer is presented on the graphical user interface. At step 306, an instruction is received from the consumer via a user input device (e.g., a mouse, a keyboard, or a touch screen) to sort the target into a bin presented on the graphical user interface. The bin is selected from two or more sorting bins presented on the graphical user interface. At step 308, consumer response data associated with the instruction from the consumer is generated. The consumer response data includes a sort time, a sort accuracy, and/or a sort intensity. At step 310, steps 302 to 308 are repeated for a plurality of primes and targets. At step 312, the consumer response data is evaluated to determine the consumer's perception of (e.g., affinity toward) the brand, the product, and/or the service.

In various embodiments, the consumer response data is evaluated using hierarchical Bayesian estimation techniques. For example, hierarchical Bayesian estimation techniques may be used to absolve the violation of statistical assumptions surrounding mean-imputed data and building a model that estimates covariation, or parameterizing the similarity in associations for any two prime-target combinations across the entire sample of participants.

Embodiments of the systems and methods described herein may be implemented on computer in any suitable screen resolution, including, for example: 40×320, 320×480, 320×568, 480×800, 540×960, 1024×768, 1366×768, 1280×800, and 1920×1080. The browsers that may be utilized include, for example, Safari on iOS (v3.2 and higher), Android Browser (v2.0 and higher), Google Chrome (v18 and higher), Firefox (v5 and higher), Internet Explorer (v9 and higher), and BlackBerry (v6.0 and higher). Both portrait and landscape orientations are supported.

Embodiments of the systems and methods are able to automatically detect the browser and/or display size associated with the device used by the consumer. This allows the systems and methods to automatically determine the most appropriate way to interact with and receive input from the consumer (e.g. swiping a touch screen or pressing a key on a keyboard).

In some implementations, the systems and methods may, with permission, take or receive a photograph of the consumer (e.g., using a webcam) and use the photograph as a prime and/or target for sorting in subsequent exercises. The photograph may be used instead of words like "me" and "myself" when the systems and methods are assessing the degree of association between the self and a brand, product, service, etc. In general, use of the photograph makes the task more personal, and may represent a better assessment of the true connection between the self and the brand, product, or service. Further, in some instances, the systems and methods may utilize any personal marker, such as a photograph of the consumer, an image of the consumer's signature, an audial file with the consumer speaking his or her name, the word "me," or the word "myself," and/or an image of a celebrity the consumer most admires or would like to be. These personal markers may be included as targets for sorting and/or as primes, depending on the exercise, and may be randomly displayed or provided along with other non-personal markers.

In certain embodiments, the systems and methods described herein interact with end-users in either an online environment or in a central testing facility on a computer. The end-users are typically consumers (e.g., prospective or current customers) accessing the invention through a web browser on a computer or mobile device. The systems and methods may also be used by management staff (e.g., managers, directors, VPs, and higher) within enterprise clients, for example, to run through demos and testing studies, prior to the launch of a study. Researchers may use the systems and methods to design and analyze custom studies for clients. In some instances, technology development partners use the systems and methods during development and enhancement stages. Consumers may utilize the systems and methods to gauge any automatic association between a prime that is of interest to them (e.g., a picture of a consumer in new apparel, a consumer's proposed job title, or a video of a consumer dancing) and an emotion or association the consumers are seeking to evoke or prevent (e.g., cool, sexy, happy, angry, embarrassment).

The commercial potential of the systems and methods described herein is significant. In particular, the marketing research industry may benefit directly from the systems and methods as a more advanced and broad reaching tool used to understand implicit associations with brands, products, packaging pricing and the impact of advertising. Other industries may find value in the ability of the systems and methods to derive implicit information through the observation of behavior.

Figure 17:
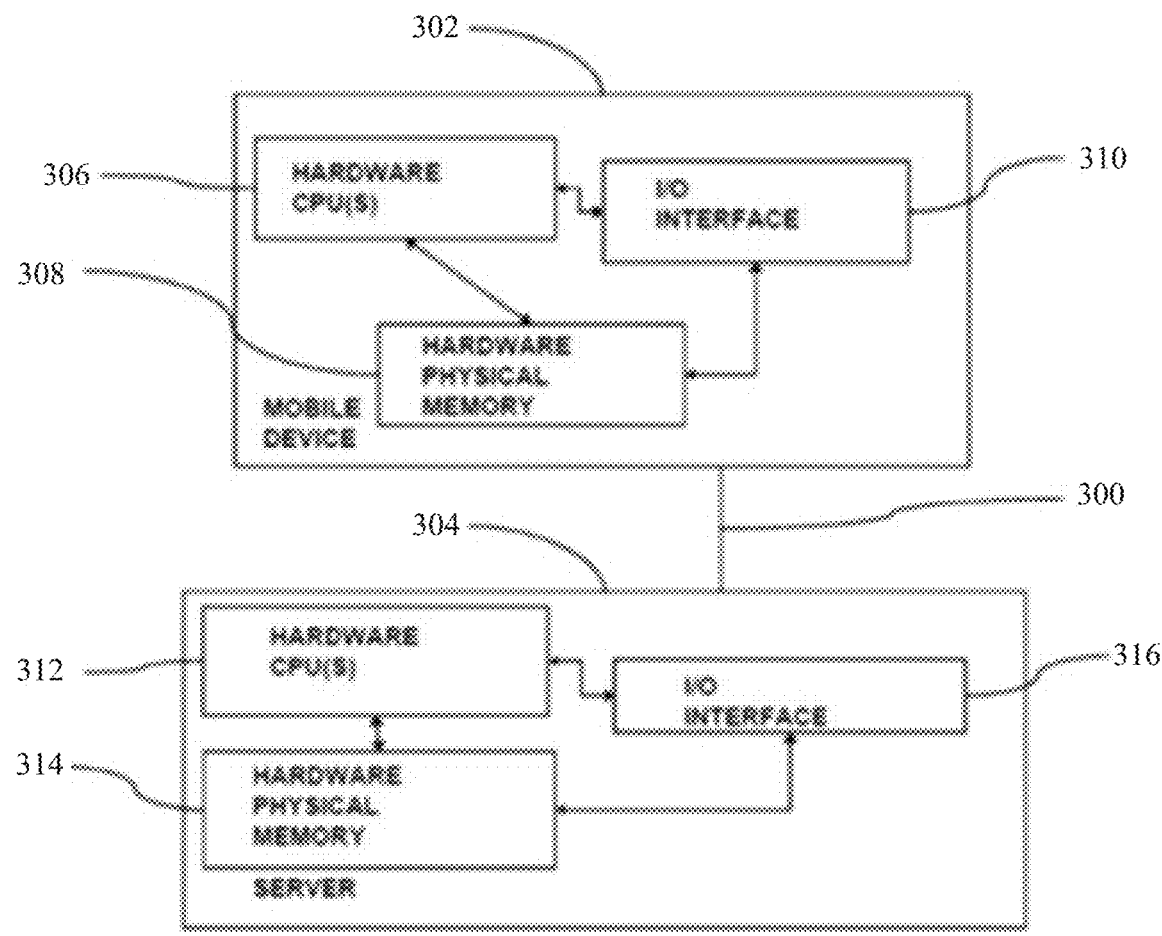
FIG. 17 is a schematic diagram of a system for assessing consumer perception, according to an illustrative embodiment of the invention.

Referring to FIG. 17, in certain embodiments, a communications network 300 generally connects a mobile device 302 or other device (e.g., a personal computer, a tablet computer, or a workstation) with a server 304, and in the case of peer to peer communications, connects two peers. The communication may take place via any media such as standard telephone lines, LAN or WAN links (e.g., T1, T3, 56 kb, X.25), broadband connections (ISDN, Frame Relay, ATM), wireless links (802.11, Bluetooth, etc.), and so on. Preferably, the network can carry TCP/IP protocol communications, and HTTP/HTTPS requests made by a web browser and the connection may be made between the peers and communicated over such TCP/IP networks.

The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet, which may accommodate many different communications media and protocols.

Mobile device 302 and server(s) 304 may be implemented in any suitable way. FIG. 17 illustrates an exemplary architecture for a mobile device 302 and a server 304 that may be used in some embodiments. The mobile device 302 may include hardware central processing unit(s) (CPU) 306, operatively connected to hardware/physical memory 308 and input/output (I/O) interface 310. Exemplary server 304 similarly comprises hardware CPU(s) 312, operatively connected to hardware/physical memory 314 and input/output (I/O) interface 316. Hardware/physical memory may include volatile and/or non-volatile memory. The memory may store one or more instructions to program the CPU to perform any of the functions described herein. The memory may also store one or more application programs.

Exemplary mobile device 302 and exemplary server 304 may have one or more input and output devices. These devices can be used, among other things, to present a user interface and/or communicate (e.g., via a network) with other devices or computers. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote computer storage media including memory storage devices.

In some cases, relational (or other structured) databases may provide such functionality, for example as a database management system which stores data related to the services and consumers utilizing the service. Examples of databases include the MySQL Database Server or ORACLE Database Server offered by ORACLE Corp. of Redwood Shores, CA, the PostgreSQL Database Server by the PostgreSQL Global Development Group of Berkeley, CA, or the DB2 Database Server offered by IBM.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, or another operating system of platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool.

The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed microprocessor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A computer-implemented method of assessing perception, the method comprising:
   (a) presenting a graphical user interface on a device of a user, the graphical user interface comprising: a three-dimensional depiction of a first sorting bin and a second sorting bin, wherein the first sorting bin appears to be close to the user and the second sorting bin appears to be far from the user; an accuracy gauge; and a speed gauge;
   (b) presenting a prime on the graphical user interface;
   (c) presenting a target on the graphical user interface;
   (d) receiving an instruction from the user to sort the target into either the first sorting bin or the second sorting bin, wherein an accurate sort instruction comprises either a natural approach reaction or a natural avoidance reaction;
   (e) determining an accuracy and a speed associated with the instruction from the user, wherein the accuracy gauge and the speed gauge provide a real-time indication of the accuracy of the instruction and the speed of the instruction;
   (f) repeating steps (b) to (e) for a plurality of primes and targets; and
   (g) determining the user's perception of at least one prime based on the determined accuracy and speed for the plurality of primes and targets.

2. The method of claim 1, wherein the device comprises a touch screen, and wherein the instruction comprises a swipe performed by the user along a surface of the touch screen.

3. The method of claim 2, further comprising determining a velocity of at least one swipe along the surface of the touch screen,
   wherein the user's perception of the at least one prime is determined based on the velocity.

4. The method of claim 1, wherein presenting the prime comprises expanding at least one prime from the plurality of primes to a larger size.

5. The method of claim 1, wherein presenting the target comprises displaying the target at a center location of the graphical user interface, and wherein the target comprises a target feature associated with either the first sorting bin or the second sorting bin.

6. The method of claim 1, wherein at least one prime from the plurality of primes or at least one target from the plurality of targets comprises a personal marker of the user.

7. The method of claim 1, wherein the first sorting bin is presented beneath the second sorting bin on the graphical user interface, wherein the natural approach reaction comprises sorting the target into the first sorting bin, and wherein the natural avoidance reaction comprises sorting the target into the second sorting bin.

8. The method of claim 1, wherein the natural approach reaction comprises at least one of swiping toward the user on a touch screen, tilting the device toward the user, nodding a head of the user up and down, providing a positive audio response, or pressing a first key on a keyboard, and wherein the natural avoidance reaction comprises at least one of swiping away from the user on the touch screen, tilting the device away from the user, shaking the head of the user left to right, providing a negative audio response, or pressing a second key on the keyboard.

9. The method of claim 1, wherein determining the speed comprises determining a time between presentation of the target and receipt of the instruction.

10. The method of claim 1, wherein determining the user's perception comprises performing hierarchical Bayesian estimation.

11. The method of claim 1, wherein the real-time indication comprises an audible sound indicating the accuracy of the instruction.

12. A system for assessing user perception, the system comprising:
    a computer readable storage device medium having instructions stored thereon; and
    a data processing apparatus configured to execute the instructions to perform operations comprising:
    (a) presenting a graphical user interface on a device of a user, the graphical user interface comprising: a three-dimensional depiction of a first sorting bin and a second sorting bin, wherein the first sorting bin appears to be close to the user and the second sorting bin appears to be far from the user; an accuracy gauge; and a speed gauge;
    (b) presenting a prime on the graphical user interface;
    (c) presenting a target on the graphical user interface;
    (d) receiving an instruction from the user to sort the target into either the first sorting bin or the second sorting bin, wherein an accurate sort instruction comprises either a natural approach reaction or a natural avoidance reaction;
    (e) determining an accuracy and a speed associated with the instruction from the user, wherein the accuracy gauge and the speed gauge provide a real-time indication of the accuracy of the instruction and the speed of the instruction;
    (f) repeating steps (b) to (e) for a plurality of primes and targets; and
    (g) determining the user's perception of at least one prime based on the determined accuracy and speed for the plurality of primes and targets.

13. The system of claim 12, wherein the device comprises a touch screen, and wherein the instruction comprises a swipe performed by the user along a surface of the touch screen.

14. The system of claim 13, further comprising determining a velocity of at least one swipe along the surface of the touch screen, wherein the user's perception of the at least one prime is determined based on the velocity.

15. The system of claim 12, wherein presenting the prime comprises expanding at least one prime from the plurality of primes to a larger size.

16. The system of claim 12, wherein presenting the target comprises displaying the target at a center location of the graphical user interface, and wherein the target comprises a target feature associated with either the first sorting bin or the second sorting bin.

17. The system of claim 12, wherein the first sorting bin is presented beneath the second sorting bin on the graphical user interface, wherein the natural approach reaction comprises sorting the target into the first sorting bin, and wherein the natural avoidance reaction comprises sorting the target into the second sorting bin.

18. The system of claim 12, wherein the natural approach reaction comprises at least one of swiping toward the user on a touch screen, tilting the device toward the user, nodding a head of the user up and down, providing a positive audio response, or pressing a first key on a keyboard, and wherein the natural avoidance reaction comprises at least one of swiping away from the user on the touch screen, tilting the device away from the user, shaking the head of the user left to right, providing a negative audio response, or pressing a second key on the keyboard.

19. The system of claim 12, wherein the real-time indication comprises an audible sound indicating the accuracy of the instruction.

20. A non-transitory computer-readable medium for controlling a processing mode of a data processing apparatus, the non-transitory computer-readable medium being executable by the data processing apparatus to cause the data processing apparatus to perform operations comprising:

(a) presenting a graphical user interface on a device of a user, the graphical user interface comprising: a three-dimensional depiction of a first sorting bin and a second sorting bin, wherein the first sorting bin appears to be close to the user and the second sorting bin appears to be far from the user; an accuracy gauge; and a speed gauge;
(b) presenting a prime on the graphical user interface;
(c) presenting a target on the graphical user interface;
(d) receiving an instruction from the user to sort the target into either the first sorting bin or the second sorting bin, wherein an accurate sort instruction comprises either a natural approach reaction or a natural avoidance reaction;
(e) determining an accuracy and a speed associated with the instruction from the user, wherein the accuracy gauge and the speed gauge provide a real-time indication of the accuracy of the instruction and the speed of the instruction;
(f) repeating steps (b) to (e) for a plurality of primes and targets; and
(g) determining the user's perception of at least one prime based on the determined accuracy and speed for the plurality of primes and targets.

* * * * *